Nov. 5, 1957 A. C. HOWARD 2,811,912
EARTH-WORKING ROTOR FOR AN EARTH-WORKING MACHINE
Filed Jan. 4, 1954 2 Sheets-Sheet 1
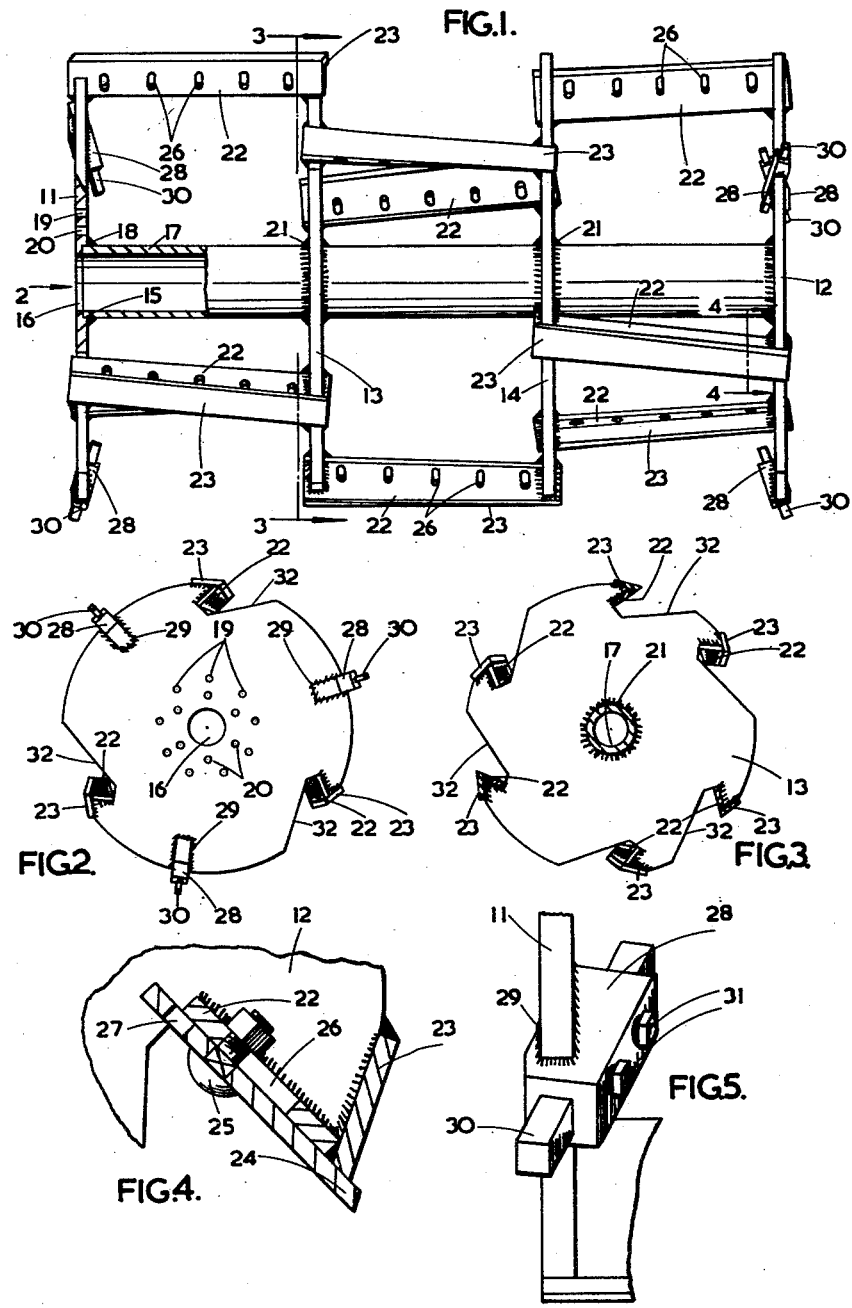

Nov. 5, 1957     A. C. HOWARD     2,811,912
EARTH-WORKING ROTOR FOR AN EARTH-WORKING MACHINE
Filed Jan. 4, 1954     2 Sheets-Sheet 2
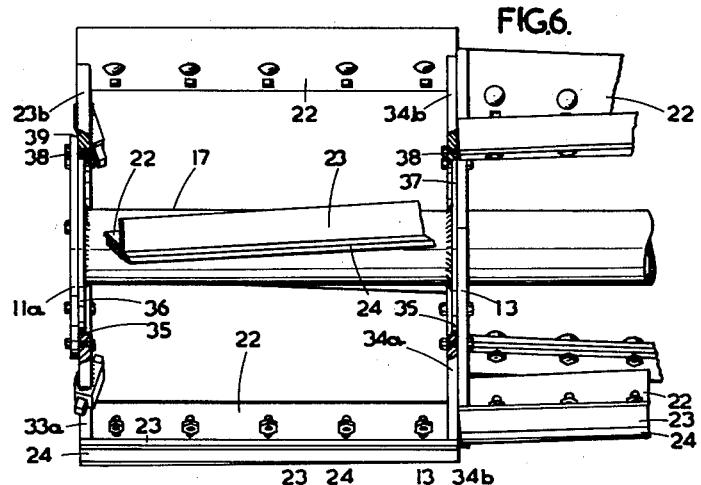
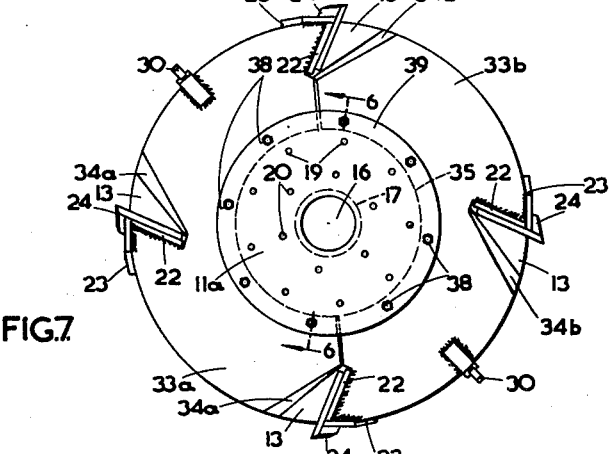
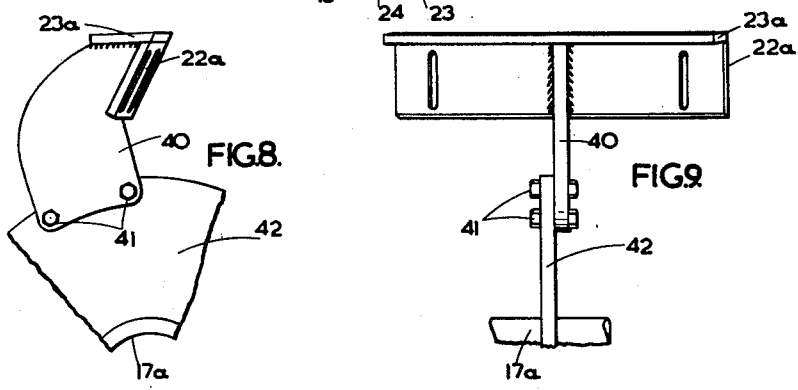

United States Patent Office 2,811,912
Patented Nov. 5, 1957

2,811,912

EARTH-WORKING ROTOR FOR AN EARTH-WORKING MACHINE

Arthur Clifford Howard, East Horndon, England, assignor to Rotary Hoes Limited, East Horndon, England Application January 4, 1954, Serial No. 402,032

Claims priority, application Great Britain January 8, 1953

6 Claims. (Cl. 97—215)

The invention relates to an earth-working rotor of the kind which is to be supported from an earth-working machine (e. g., a rotary cultivator or a soil pulveriser) for its axis to be transverse to the direction of travel of the machine and to be driven from the latter, the rotor including generally longitudinally-extending blades which are circumferentially spaced about its periphery. As these blades can be of a material length (e. g., two or three feet) between supports it has hitherto been the practice to make them of stout section, whereby to enable them to avoid being deflected during use. Such blades are subject to hard wear and, although their operative edges may be hardened, the scrapping of a relatively large amount of metal is involved when the blades have to be renewed.

The object of the invention is an improved earth-working rotor of this kind with which the above-mentioned disadvantages are mitigated.

According to the invention the blades are made thin and supported, for the operative edges thereof to be further from the rotor axis than are their opposite edges, flatly and throughout their lengths from stiff backing plates which are fast with axially-spaced, radially-extending supports fast with the rotor shaft.

Preferably, and according to a further feature, the rotor also includes stiffening plates fast with the radially-extending supports and arranged edgewise to the one sides, adjacent the backing plates, of portions of the blades which extend outwardly of the backing plates, the adjacent edges of the stiffening plates engaging the said blade portions laterally throughout the lengths of the blades and opposing bending of the said blade portions during operation of the rotor.

There can be more than one circumferential series of blades and associated backing plates (and, as appropriate, stiffening plates) arranged end to end in the longitudinal direction of the rotor, and by arranging for at least one of these series to be detachable from the rotor, or by making the rotor shaft of inter-engaging, separable, axial sections of which each has associated with it one of the said circumferential series, it can be arranged for the effective overall length of the rotor to be changed by the addition or removal of one or more of the series.

The blades are preferably mounted from the backing plates so that the distances of their operative edges from the rotor axis can be adjusted. Thus, the backing plates can be provided with outwardly-directed, closed slots through which, and through holes in the blades, the latter can be held as by through-bolts. Conveniently the blades have more than one hole in each holding position, the holes being arranged tandem-wise so that when the adjustment provided by the outer hole is exhausted the bolts can be re-positioned in other holes for enhancing the useful lives of the blades.

The radially-extending supports can be brackets, or they can be discs with peripheral V-notches to the one sides of which the adjacent ends of the backing plates are secured (e. g., as by welding) for supporting the blades with their planes at a predetermined cutting angle, and in this case the opposite sides of the notches are arranged at such an angle as to provide clearance for the operation of the blades on the earth. Also, and according to yet another feature, some or all of the discs may be equipped, circumferentially intermediate the positions in which the blades are supported, with a radially-extending tool for cutting a clearance for the disc in the earth, and such a tool, which may be mounted so that the degree of its extension can be adjusted, also serves to minimise wearing of the adjacent ends and corners of the blades.

The blades are preferably made as thin as is consistent with them being able to stand up to the work, and their leading edges can either have wear-resistant inserts bonded to them or be coated (e. g., by arc welding) with an extremely hard surfacing material such, for instance, as that known as Stellite. Such inserts or coatings are preferably of a width to cater for the full range of adjustment of the blades, but should they be narrower, and the hardened surface wear away, the backing material (i. e., the previously coated portion of the blade) will wear away easily and not be bent out of operative position with possible harmful effects to the work being done.

The blades may run in straight or curved lengths from one end of the rotor to the other, or they may be arranged helically. Also, and in the case where separate circumferential series of blades are employed, the blade lengths in adjacent series can be staggered so as not to give a continuous cut from one end of the rotor to the other. Where such staggered series of blade lengths are employed, the adjacent ends of the blades of two adjacent series can be supported from a common radially-extending support.

For operating on clear ground the rotor is preferably driven in the direction opposite to that in which it would, if free, be rolled by the progression of the machine, but it is preferable for it to be driven in the opposite direction for operating on ground containing obstacles (e. g., large stones or roots). As the same rotor could conveniently be used for both purposes it can conveniently be made for mounting either way round in an earth-working machine and be provided (e. g., at both ends) with means for taking the drive from the machine.

In the drawings:

Figure 1 is an elevation, partly in section, of one form of the rotor, the blades being omitted for clearness of illustration;

Figure 2 is an end view, to a smaller scale, in the direction of the arrow 2 in Figure 1;

Figure 3 is a sectional view, to the same smaller scale, on the line 3—3 of Figure 1;

Figure 4 is a section, to an enlarged scale, on the line 4—4 of Figure 1 and showing how the blades are mounted;

Figure 5 is a detail view, to a still larger scale, in the direction of the arrow 5 of Figure 2 and showing a tool in position for cutting a clearance for the disc;

Figures 6 and 7 are views which are respectively similar to Figures 1 and 2 but of a modified construction, although a portion of Figure 6 is shown in section on the line 6—6 of Figure 7; and Figures 8 and 9 are, respectively, side and rear views of an alternative support for the blades.

Referring to Figures 1 to 5, the rotor comprises a pair of end discs 11, 12 like the one shown in Figure 2, and a pair of intermediate discs 13, 14 like the one shown in Figure 3. Each of the discs 11, 12 has a spigotal connection 15, round a central hole 16, to the adjacent end of a hollow shaft 17 and is welded to the latter at 18, the discs 11, 12 being provided with rings of holes 19, 20 for the attachment of a driving means (not shown) which forms no part of the invention. The discs 13, 14 have central holes closely engaging the shaft 17 and are welded thereto at 21, 21.

Each of the end discs 11, 12 has a series (three, in the example shown) of notches which are equally spaced round its circumference and are substantially of unequal V formation, and the intermediate discs 13, 14 have a first series of similar notches which are angularly displaced, in the same cyclical sense, with respect to those on the adjacent end disc. The discs 13 and 14 also each have a second series of similar notches intermediate the notches of the first series. The corresponding series of notches in the successive discs fall on notional helical lines, and have respective series of backing plates 22 welded to the shorter sides of the V, each backing plate spanning the space between two adjacent discs.

Also the discs have, secured to their peripheries by welding, stiffening plates 23 which can also have a welded connection with the backing plates such that the adjacent edge of the stiffening plates are coplanar with the backing plates.

The blades 24 (see Figure 4) are supported from the backing plates by a series of bolts 25 which pass through holes in the blades and through slots 26 of the backing plates and are secured by nuts as shown. The slots provide adjustment of the blade to compensate for wear, and to increase the range of adjustment the blades can have a second series of holes 27 with which the nuts and bolts can be engaged when the range of adjustment provided by the outer holes is exhausted. From Figure 1 it will be seen that three blades (one partially obscured) are supported between the discs 11 and 13; that three more blades, in staggered relationship to those last-mentioned, are supported from the discs 13 and 14; and that three more blades, which are staggered with respect to the last-mentioned ones, are supported from the discs 14 and 12.

For cutting a clearance in the earth for the peripheries of the end discs 11, 12 and for protecting the adjacent ends and corners of the blades from wear, there are three housings 28, 28 which are welded at 29 into rectangular recesses, of the discs, in positions intermediate the notches. The housings have inclined through-holes, of rectangular cross-section, in each of which is supported a tool 30 for cutting the clearance. The tools, which are of corresponding rectangular cross-section and can be of high speed steel, are each held in an adjusted position by a pair of set-screws 31, and in this way the tools can be made over-long and re-adjusted to compensate for wear.

In the example shown, there is no need to provide tools 30 on the discs 13, 14 because they each carry double the number of blades on the end discs, and these blades cut the clearance for their peripheries.

In operation, the rotor is driven for the blades to be at the leading side of the backing plates 22 so that the latter, and the stiffening plates 23 (when employed) provide rigidity for the blades, and the opposite sides 32 of the V-notches are at such an angle that the peripheral portions of the discs in advance of the blades are provided with clearance from the earth to be tilled.

The construction shown in Figures 6 and 7 is generally similar to that of the earlier figures excepting that provision is made for detaching the end series of blades and their supports. For that purpose the intermediate series of blades, their backing plates and stiffening plates are mounted from the shaft 17 as before, but the end series is supported at each end by pairs of semi-rings 33a, 33b and 34a, 34b. The inner peripheries of these pairs of semi-rings seat on steps 35 of discs 36, 37 which are fast with the shaft 17 but of smaller diameter than the discs 13 and 14 (the latter not being shown in Figure 6), and the semi-rings of each pair are secured by rings of bolts 38 to a surface extending radially-outwardly of the steps. As shown, the step 35 for the semi-rings 33a, 33b is formed in an end plate 11a fast with the shaft 17, the step leaving a radial flange 39 for the bolts 38, and the step 35 for the semi-rings 34a, 34b is formed integrally with the disc 13 supporting the adjacent series of blades.

By removing the bolts 38 the semi-rings are liberated to be removed laterally of the shaft 17, leaving the rotor of less effective length.

The construction illustrated by Figures 8 and 9 shows an alternative form of backing plate 22a, the latter being generally T-shaped and having its central limb 40 secured by a pair of bolts 41, 41 to a flange 42, of the hollow shaft 17a, which is of less radial extent than the discs 11 to 14 of the construction shown in Figure 1. A stiffening plate 23a is also shown, and it, together with the backing plate and central limb, can conveniently be formed separately and welded together where they abut each other. It will be seen that with this construction the backing and stiffening plates are supported from their centres, and that the flanges 42 will be correspondingly displaced axially of the shaft 17a as compared with the positions of the discs 11 to 14 of Figure 1. The backing plate 22a is shown with two slots only for the attachment of the blades, but obviously more than two slots would be used if the blades were to be of a sufficient length to require supporting at intermediate positions.

What I claim as my invention and desire to secure by Letters Patent of the United States is:

1. An earth-working rotor comprising axially-spaced, radially-extending supporting discs, the discs having peripheral parts, a circumferential arrangement of generally longitudinally-extending stiff backing plates fast with said supporting discs adjacent the outer peripheral parts of said discs, earth-working blades, and means detachably securing said blades respectively to said backing plates, said blades having edge portions extending radially beyond said backing plates, said blades being of metal which is too thin of itself to withstand the stresses of operation and being supported flatly and throughout their lengths by said backing plates against said stresses, and additional stiffening plates fast with said supports, said stiffening plates arranged edgewise to the respective backing plates and edgewise to the respective blades and abutting the blades adjacent said edge portions whereby further to support them against said stresses and to reduce the bending moments applied to said blades during earth working.

2. An earth-working rotor comprising axially-spaced, radially-extending supporting discs, a circumferential arrangement of generally longitudinally-extending stiff backing plates fast with said supporting discs adjacent the outer peripheral parts of said discs, earth-working blades, and bolt and slot means detachably securing said blades respectively to said backing plates for edge portions of said blades to extend radially beyond said backing plates, said bolt and slot means providing adjustment for the amount by which said edge portions so extend, and said blades being of metal which is too thin of itself to withstand the stresses of operation and being supported flatly and throughout their lengths by said backing plates against said stresses and additional stiffening plates fast with said supporting discs, said stiffening plates arranged edgewise to the respective backing plates and abutting the blades adjacent said edge portions whereby further to support them against said stresses.

3. An earth-working rotor, according to claim 1, of which at least one of the circumferential arrangements of backing plates is held in position by means which can be disengaged for releasing said arrangement from the rotor.

4. An earth-working rotor comprising axially-spaced discs concentrically fast with a shaft of the rotor, a circumferential series of peripheral V-notches with unequal sides in each said disc, generally longitudinally-extending stiff backing plates fast at their ends with the shorter sides of respective notches in adjacent ones of said discs, earth-working blades, and means detachably securing said blades respectively to said backing plates, said blades having edge portions extending radially beyond said backing plates, and said blades being of metal which is too thin of itself to withstand the stresses of operation and being supported flatly and throughout their lengths by said backing plates against said stresses, additional stiffening plates being provided fast with said discs adjacent their outer peripheries, said additional stiffening plates being arranged edgewise to said blades so as to abut said blades adjacent the outer peripheral edge portions of the blades whereby to provide additional support for the blades.

5. An earth-working rotor, according to claim 4, in which the notches of adjacent discs lie on parallel notional helices.

6. The combination with an earth-working rotor according to claim 4 of means for cutting in the earth a clearance for an un-notched portion of the periphery of at least an end one of said discs, said means comprising a housing fast with said un-notched portion, a tool slidable in said housing, and means for locking said tool in an adjusted position, said tool having an operative end extending radially beyond said periphery to cut the clearance.

References Cited in the file of this patent

UNITED STATES PATENTS

| | | |
|---|---|---|
| 228,653 | Lee | June 8, 1880 |
| 763,324 | Roberts | June 21, 1904 |
| 907,173 | Priddy | Dec. 22, 1908 |
| 1,289,094 | Berger | Dec. 31, 1918 |
| 1,543,515 | Pickard | June 23, 1925 |